(12) United States Patent
Castinado et al.

(10) Patent No.: US 11,388,052 B2
(45) Date of Patent: Jul. 12, 2022

(54) GATEWAY DEVICE FOR MONITORING DEPLOYED EQUIPMENT

(71) Applicant: BANK OF AMERICA CORPORATION, Charlotte, NC (US)

(72) Inventors: Joseph Benjamin Castinado, North Glenn, CO (US); Martha Sain McClellan, Lancaster, SC (US); Lee Ann Proud, Ponte Vedra, FL (US); Kathleen Hanko Trombley, Oakboro, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 171 days.

(21) Appl. No.: 16/674,884

(22) Filed: Nov. 5, 2019

(65) Prior Publication Data
US 2021/0135939 A1    May 6, 2021

(51) Int. Cl.
*H04L 41/0816* (2022.01)
*H04L 43/0882* (2022.01)
*H04L 12/66* (2006.01)
*H04L 47/80* (2022.01)

(52) U.S. Cl.
CPC .......... *H04L 41/0816* (2013.01); *H04L 12/66* (2013.01); *H04L 43/0882* (2013.01); *H04L 47/803* (2013.01)

(58) Field of Classification Search
CPC . H04L 41/0816; H04L 43/0882; H04L 12/66; H04L 47/803
USPC ......................................... 709/224; 705/26.1
See application file for complete search history.

(56) References Cited

U.S. PATENT DOCUMENTS

| 7,165,041 B1 * | 1/2007 | Guheen | G06Q 30/04 705/26.1 |
|---|---|---|---|
| 2013/0262559 A1 * | 10/2013 | Neerings | G06Q 30/02 709/203 |
| 2014/0282073 A1 * | 9/2014 | Curran | G06F 3/0488 715/750 |
| 2015/0347989 A1 * | 12/2015 | Kumar S | G06Q 20/027 705/44 |
| 2016/0098261 A1 * | 4/2016 | Habib | H04L 67/06 717/171 |

* cited by examiner

*Primary Examiner* — David R Lazaro
*Assistant Examiner* — Mariegeorges A Henry
(74) *Attorney, Agent, or Firm* — Moore & Van Allen PLLC; James C. Edwards (57) ABSTRACT

A system that provides for managing deployed resource interaction devices/equipment through a gateway device that is capable of monitoring the performance of the resource interaction devices/equipment to determine a need for revisions/updates to the resource interaction event application, additional services and/or different resource interaction devices types.

14 Claims, 8 Drawing Sheets

GATEWAY DEVICE FOR MONITORING DEPLOYED EQUIPMENT

FIELD OF THE INVENTION

The present invention is generally related to resource interaction devices and, more specifically, managing deployed resource interaction devices including monitoring the performance of the resource interaction devices for revision updates, additional alternate resource interaction device types and services.

BACKGROUND

Typically, resource interaction devices are highly customized depending on how the resource interaction device user desires to accept resources and the environment in which the resource interaction device is deployed. Additionally, since the resource interaction device is effectively a computing platform other customization may include other uses besides resource interactions that relevant to the user's other functions.

Since the equipment is typically customized, many different resource interaction device providers are utilized in the fulfillment of resource interaction device requests. As such the entity in control or otherwise procuring the resource interactions equipment for the users has a desire to manage the fulfillment process of such equipment to ensure that equipment meets requisite fulfillment requirements in terms of technical requirements, quality requirements, time for delivery and the like.

In addition, once the resource interaction is deployed a need exists to make sure that the device is functioning properly and meets the need of the end user. In this regard a need exists to make sure that the resource interaction event application is suited for the specific needs of the end user. Moreover, a need exists to make sure that the end user is provided with ancillary services that support the resource interaction event application and is provided with the proper type of resource interaction devices so as to maximize efficiency of the overall resource interaction event process.

Further, a need exists to develop systems, methods, computer program products and the like that provide for managing the resource interaction device fulfillment process. The desires systems and the like should provide for a centralized entity in control or otherwise procuring the resource interaction device to manage/orchestrate the data communications between all of the resource interaction device providers. Moreover, a need exists to guarantee a high level of security within all of the data communications and insure that information pertaining to resource interaction device fulfillment process is disseminated to resource interaction device providers on a need-to-know basis. Moreover, a need exists for the centralized entity to have a dynamic view of the current state of the fulfillment process, such that dynamic changes to the fulfillment process can be made to insure adherence to fulfillment requirements.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing systems, methods, computer program product and/or the like that provides for management of deployed resource interaction devices. In this regard a gateway apparatus is implemented with a monitoring application to monitor the performance of the deployed resource interaction devices. By monitoring the performance of the resource interaction devices, the application is able to determine whether the resource interaction event application executing on the deployed devices require device-specific updates/revisions. Once such a determination is made, the present invention is capable of identifying and/or generating such device-specific updates/revisions and deploying the updates/revisions to the applicable devices.

In addition the monitoring of the performance of the deployed resource interaction devices provides for determining/identifying that the end user requires other types of the resource interaction devices and/or other ancillary services. In this regard, the monitoring of the resource interaction devices provides for more efficiency in the overall resource interaction event process, as well as, managing other systems for the end user.

A system for managing deployed resource interaction device defines first embodiments of the invention. The system includes a plurality of resource interaction devices, each device deployed at one of a plurality of resource interaction locations. Further, each resource interaction device includes a computing platform having a first memory, one or more first processing devices in communication with the first memory and a resource interaction event application stored in the first memory. The resource interaction event application is executable by the at least one of the first processing devices and configured to initiate performance of resource interaction events. The system additionally includes a gateway apparatus including a second computing platform having a second memory, one or more second processing devices in communication with the second memory. The gateway apparatus is in distributed communication network communication with the plurality of interaction devices. The gateway apparatus includes a monitoring application that is stored in the second memory and executable by at least one of the second processing devices. The monitoring application is configured to monitor the plurality of resource interaction devices including monitoring the resource interaction event application executing on each of the plurality of resource interaction devices, and, in response to the monitoring, determine that one of the resource interaction event applications executing on one of the resource interaction devices requires a revision that is specific to the one of the resource interaction event applications.

In specific embodiments of the system, the gateway apparatus further includes a software revision deployment application that is stored in the second memory and executable by at least one of the second processing devices. The software revision deployment application is configured to, in response to determining that one of the resource interaction event applications requires the revision, perform one of identifying or generating the revision required by the one of the resource interaction event applications and deploy the revision to the one of the resource interaction event applications.

In still further specific embodiments of the system, the gateway apparatus is configured to monitor the resource interaction event application for at least one of (i) average time for performing a resource interaction event, (ii) average time between resource interaction events and (iii) average volume of resource interaction events occurring over predetermined time periods. In other related specific embodiments of the system, the gateway apparatus is configured to monitor the resource interaction event application for errors occurring in the performance of a resource interaction events. While in still further related embodiments of the system, the gateway apparatus is configured to monitor the resource interaction event application for at least one of (i) specific objects or types of objects included in resource interaction events, (ii) volume of resources associated with resource interaction events, and (iii) types of resource event vehicles used to perform the resource interaction events.

In additional specific embodiments of the system, the monitoring application is further configured to, in response to the monitoring, determine one or more service applications to deploy on the resource interaction device. The one or more services applications are integrated with the resource interaction event application. In related embodiments of the system, the one or more service applications include an inventory management and control application.

Moreover, in additional specific embodiments of the system, the monitoring application is further configured to, in response to monitoring, determine one or more different types of resource interaction devices to deploy to the resource interaction location.

A computer-implemented method for managing deployed resource interaction devices defines second embodiments of the invention, The method is executed by one or more computing processor devices. The method includes connecting, via a distributed communication network, a plurality of resource interaction devices with a gateway apparatus. Each of the resource interaction devices execute a resource interaction event for initiating performance of resource interaction events. The method further includes monitoring, via the gateway apparatus, the plurality of resource interaction devices including monitoring the resource interaction event application executing on each of the plurality of resource interaction devices, and, in response to the monitoring, determining that one of the resource interaction event applications executing on one of the resource interaction devices requires a revision that is specific to the one of the resource interaction event applications.

In specific embodiments the method further includes, in response to determining that one of the resource interaction event applications requires the revision (i) identifying or generating the revision required by the one of the resource interaction event applications, and (ii) deploying the revision to the one of the resource interaction event applications.

In other specific embodiments of the method, monitoring, via the gateway apparatus, the plurality of resource interaction devices includes monitoring the resource interaction event application for at least one of (i) average time for performing a resource interaction event, (ii) average time between resource interaction events, and (iii) average volume of resource interaction events occurring over predetermined time periods. In related embodiments of the method, monitoring, via the gateway apparatus, the plurality of resource interaction devices includes monitoring the resource interaction event application for errors occurring in the performance of a resource interaction events. While in still further related embodiments of the method, monitoring, via the gateway apparatus, the plurality of resource interaction devices includes monitoring includes monitoring at least one of (i) specific objects or types of objects included in resource interaction events, (ii) volume of resources associated with resource interaction events, and (iii) types of resource event vehicles used to perform the resource interaction events.

In still further specific embodiments the method includes, in response to the monitoring, determining one or more service applications to deploy on the resource interaction device, wherein the one or more services applications are integrated with the resource interaction event application. In other specific embodiments the method includes, in response to monitoring, determining one or more different types of resource interaction devices to deploy to the resource interaction location.

A computer program product including a non-transitory computer-readable medium defines third embodiments of the invention. The computer-readable medium includes a first set of codes for causing a computer to connect, via a distributed communication network, a plurality of resource interaction devices with a gateway apparatus. Each of the resource interaction devices execute a resource interaction event for initiating performance of resource interaction events. The computer-readable medium additionally includes a second set of codes for causing a computer to monitor, via the gateway apparatus, the plurality of resource interaction devices including monitoring the resource interaction event application executing on each of the plurality of resource interaction devices. Further, the computer-readable medium includes a third set of codes for causing a computer to, in response to the monitoring, determine that one of the resource interaction event applications executing on one of the resource interaction devices requires a revision that is specific to the one of the resource interaction event applications.

In specific embodiments of the computer program product, the computer-readable medium includes a fourth set of codes for causing a computer to, in response to determining that one of the resource interaction event applications requires the revision, identify or generate the revision required by the one of the resource interaction event applications, and deploy the revision to the one of the resource interaction event applications.

In other specific embodiments of the computer program product, the second set of codes is further configured to cause the computer to monitor the resource interaction event application for at least one of (i) average time for performing a resource interaction event, (ii) average time between resource interaction events, (iii) average volume of resource interaction events occurring over predetermined time periods, (iv) errors occurring in the performance of a resource interaction events, (v) specific objects or types of objects included in resource interaction events, (vi) volume of resources associated with resource interaction events, and (vii) types of resource event vehicles used to perform the resource interaction events.

In further specific embodiments of the computer program product, the computer-readable-medium includes a fourth set of codes for causing a computer to, in response to the monitoring, determine one or more service applications to deploy on the resource interaction device, wherein the one or more services applications are integrated with the resource interaction event application.

In still further specific embodiments of the computer program product, the computer-readable-medium includes a fourth set of codes for causing a computer to, in response to monitoring, determine one or more different types of resource interaction devices to deploy to the resource interaction location.

Thus, according to embodiments of the invention, which will be discussed in greater detail below, the present invention provides for management of deployed resource interaction devices management of deployed resource interaction devices through the use of a gateway apparatus that monitors the performance of the deployed resource interaction devices. In this regard, the gateway apparatus executes a monitoring application to monitor the performance of the deployed resource interaction devices and determine whether the resource interaction event application executing on the deployed devices requires device-specific updates/revisions. In addition the monitoring is able to determine whether the end user requires other services ancillary to resource interaction events and/or other types of resource interaction devices.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the disclosure in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, according to embodiments of the invention, which will be described in more detail below, systems, methods and computer program products are disclosed that provide management of deployed resource interaction devices. In this regard a gateway apparatus is implemented with a monitoring application to monitor the performance of the deployed resource interaction devices. By monitoring the performance of the resource interaction devices, the application is able to determine whether the resource interaction event application executing on the deployed devices require device-specific updates/revisions. Once such a determination is made, the present invention is capable of identifying and/or generating such device-specific updates/revisions and deploying the updates/revisions to the applicable devices.

In addition the monitoring of the performance of the deployed resource interaction devices provides for determining/identifying that the end user requires other types of the resource interaction devices and/or other ancillary services. In this regard, the monitoring of the resource interaction devices provides for more efficiency in the overall resource interaction event process, as well as, managing other systems for the end user.

Figure 1:
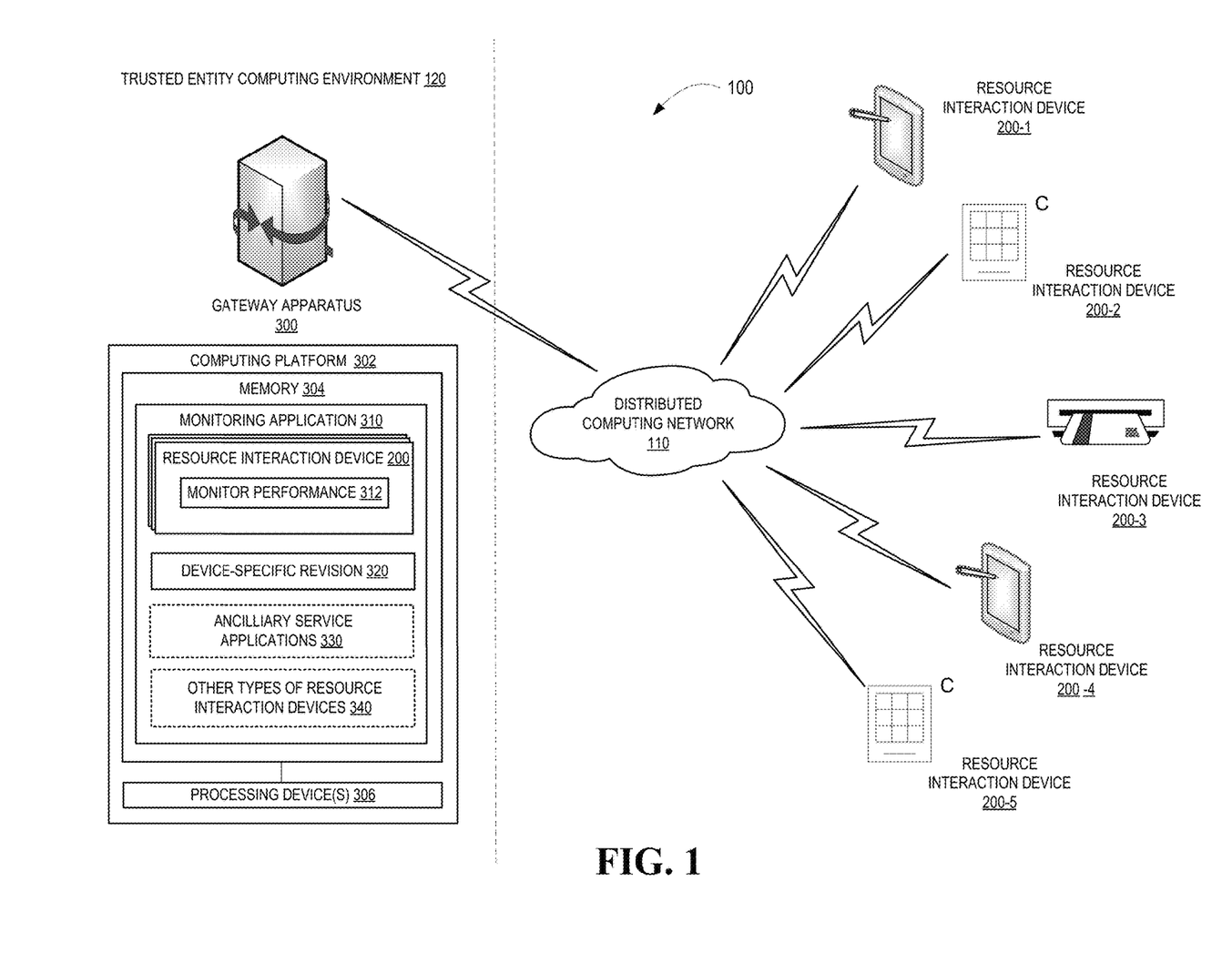
FIG. 1 is a schematic diagram of a system for managing deployed resource interaction devices, in accordance with embodiments of the present invention.

Referring to FIG. 1, a system 100 is depicted for managing deployed resource interaction devices, in accordance with embodiments of the present invention. The system is implemented in a distributed computing network 110, which may include the Internet and one or more intranets or the like. The system 100 additionally includes a plurality of resource interaction devices 200-1-200-5. In specific embodiments of the system 100, the resource interaction devices 200-1-200-5 are Point-of-Sale (POS) devices, such as credit card reading devices (i.e., insertion or swipe) or the like located at resource interaction locations, such as brick and mortar merchant locations or the like. The resource interactions devices 200-1-200-5 are configured with customized software, such as a resource interaction event application configured for initiating the performance of resource interaction events. In specific embodiments of the system 100, the resource interaction event application is a merchant-specific payment application for initiating a payment between a customer and the merchant.

The system additionally includes a gateway apparatus 300 that is located in or otherwise accessible via a trusted entity computing environment 120. The gateway apparatus 300 includes a computing platform 302 having a memory 304 and one or more processing devices 306 in communication with the memory 304. The memory 304 stores monitoring application 310 that is executable by the processing device(s) 306 and configured to connect and integrate one or more open Application Programming Interface (API) services (not shown in FIG. 1) with the plurality of resource interaction event devices 200-1-200-5. Integration of the API services with the resource interaction devices 200-1-200-5 includes deploying and implementing a trusted entity security certificate for securing data communications between the gateway apparatus 300 and the resource interaction devices 200-1-200-5. As such, the present invention leverages the security features provided for by the trusted entity's security certificate.

The monitoring application 310 is configured to, through the use of the API services, monitor performance 312 of the deployed resource interaction devices 200-1-200-5, specifically the resource interaction event application executing on the resource interaction devices 200-1-200-5. In response to the monitoring, the monitoring application 310 is configured to determine that at least one of the resource interaction event applications requires a revision that is specific to the resource interaction event application. In specific embodiments of the system 100, in which the resource interaction event application is a payment application, the revisions/updates that are required are specific (i.e., customized) for the payment application requiring such.

In additional embodiments of the system 100, the monitoring application 310 is configured to determine that the resource interaction device requires (or the resource interaction entity/end user would benefit from) additional ancillary service applications 330. In specific embodiments the ancillary service applications 330 are integrated with the resource interaction event application such the service applications communicate with and exchange data with the resource interaction event application. In those embodiments of the invention, in which the resource interaction event application is a payment application, the service applications may include an inventory control and management application, which is configured to control the inventory of the merchant based on purchasing information provided by the payment application. In additional embodiments, the service application may be an offer application configured to provide customer-tailored offers to customers based on purchasing information provided by the payment application.

In still further additional embodiments of the system 100, the monitoring application 310 is configured to determine that the resource interaction entity/end user requires or otherwise would benefit from different types 340 of resource interaction devices 200-1-200-5. For example, in those embodiments of the invention in which the resource interaction entity is merchant, the monitoring application 310 may determine that the merchant would benefit from different types of POS devices (e.g., the merchant current is limited to stationary POS/card reader devices and would benefit from having mobile POS devices (e.g., tablet devices) or the like.

Figure 2:
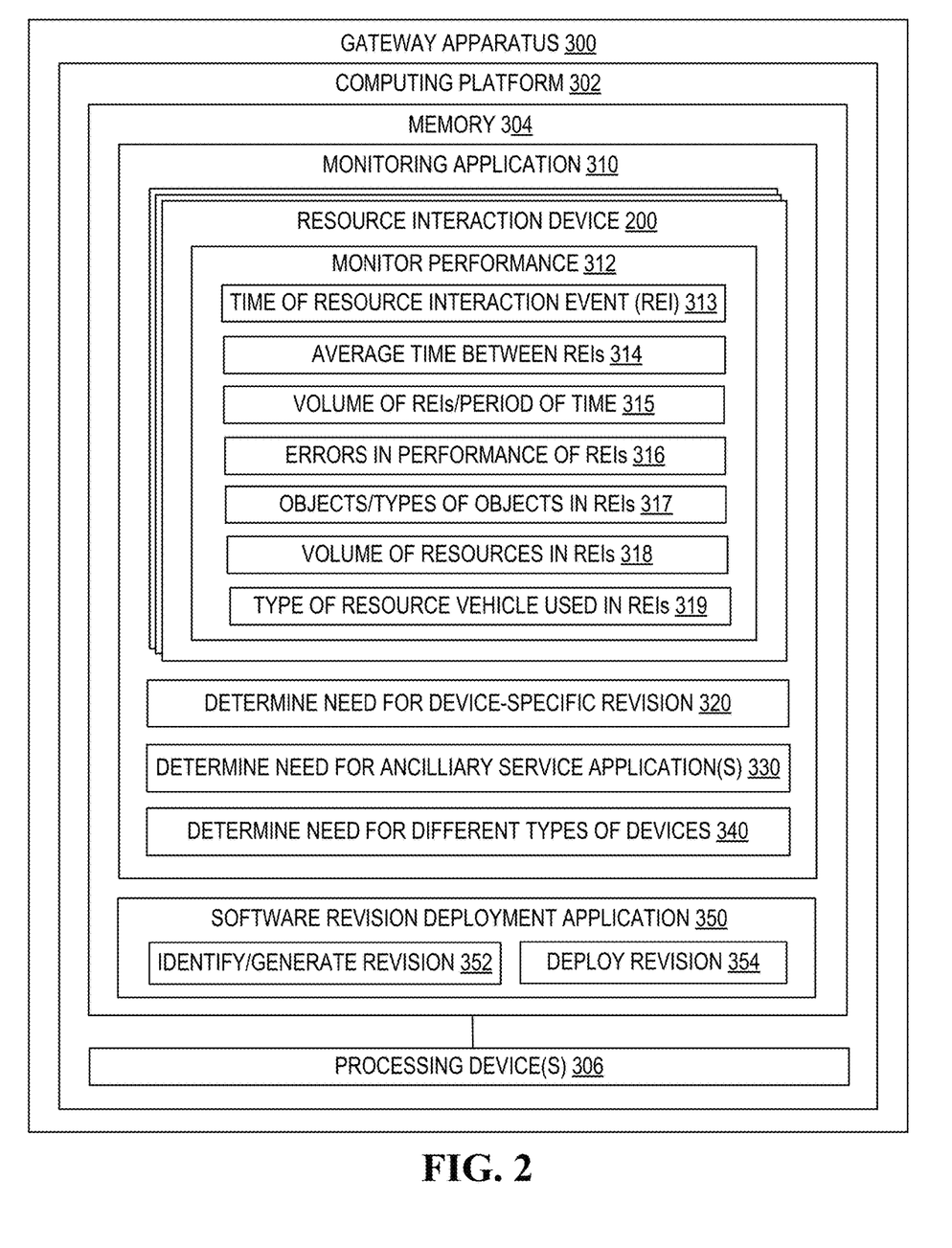
FIG. 2 is block diagram of a gateway device apparatus configured for managing deployed resource interaction devices, in accordance with embodiments of the present invention.

Referring to FIG. 2 a block diagram is depicted of a gateway apparatus 300 configured for managing resource interaction devices, in accordance with embodiments of the present invention. The gateway apparatus 300 includes a computing platform 302, which may comprise one or more computing devices (e.g., servers, computing devices, or the like) and is configured to execute instructions, such as algorithms, modules, routines, applications and the like. Computing platform 302 includes memory 304, which may comprise volatile and non-volatile memory, such as read-only and/or random-access memory (RAM and ROM), EPROM, EEPROM, flash cards, or any memory common to computing platforms). Moreover, memory 304 may comprise cloud storage, such as provided by a cloud storage service and/or a cloud connection service.

Further, computing platform 302 also includes at least one processing device 306, which may be an application-specific integrated circuit ("ASIC"), or other chipset, logic circuit, or other data processing device. Processing device(s) 306 may execute one or more application programming interface (APIs) 320 that interface with any resident programs, such as monitoring application 310, software revision deployment application 350 or the like, stored in the memory 304 of the computing platform 302 and any external programs. Processing devices(s) 306 may include various processing subsystems (not shown in FIG. 2) embodied in hardware, firmware, software, and combinations thereof, that enable the functionality of the computing platform 302 and the operability of the computing platform 302 on the distributed computing network 110 (shown in FIG. 1). For example, processing subsystems allow for initiating and maintaining communications and exchanging data with other networked devices, such as resource interaction devices (200-1-200-5 shown in FIG. 1). For the disclosed aspects, processing subsystems of processing device 306 may include any subsystem used in conjunction with monitoring application 310, software revision deployment application 350 and related tools, routines, sub-routines, algorithms, sub-algorithms, sub-modules thereof.

Computing platform 302 may additionally include a communications module (not shown in FIG. 2) embodied in hardware, firmware, software, and combinations thereof, that enables electronic communications between the computing platform 302 and other network devices, such as resource interaction devices 200. Thus, communication module may include the requisite hardware, firmware, software and/or combinations thereof for establishing and maintaining a network communication connection with one or more network devices.

Memory 302 of computing platform 300 stores monitoring application 310, which is configured to monitor performance 312 of the deployed resource interaction devices 200-1-200-5, specifically the resource interaction event application executing on the resource interaction devices 200-1-200-5. In specific embodiments of the invention, the monitoring performance 312 may include monitoring the average time of resource interaction events 314, monitoring the average time between resource interaction events 315, and monitoring the volume of resource interaction event occurring over a predetermined period of time 316 (e.g., hour, day, week or the like or specific hour within a day, specific day of the week or the like). In those embodiments of the invention, in which the resource interaction devices 200 are POS devices, the monitoring may include monitoring the average time for performing a payment transaction, monitoring the average time between payment transactions and/or monitoring the volume of payment transactions occurring over a predetermined period of time.

In other specific embodiments of the invention, the monitoring of performance 312 may include monitoring for errors 316 occurring in the performance of the resource interaction event. Such errors may include catastrophic errors that prohibit the completion of a resource interaction event or non-catastrophic errors that may merely delay or otherwise affect the resource interaction event but not prohibit the completion of the resource interaction event. In specific embodiments of the invention, in which the resource interaction event application is a payment application, the monitoring may include monitoring for errors occurring in the performance of the payment transaction.

In still further specific embodiments of the invention, the monitoring of performance 312 may include monitoring for the objects and/or types of objects 317 included in the resource interaction events, monitoring for the volume of resources 318 in resource interaction events and/or monitoring for the type of resource interaction vehicles 319 used to perform the resource interaction events. In specific embodiment of the invention, in which the resource interaction event is a payment transaction, the monitoring of performance may include monitoring the products/goods and/or type of products/goods included in the payment transactions, monitoring the amount of the payment transactions and/or monitoring the type of payment (e.g., credit, debit, card/account type) used to perform the payment transaction.

In response to the monitoring, the monitoring application 310 is configured to determine that the resource interaction event application requires a revision/update 320 that is specific to the application. In specific embodiments of the invention, in which the resource interaction event application is a payment application, the payment application requires a customized revision/update specific to the particular payment application being executed on the POS device. In such embodiments of the invention, the memory 304 of computing platform 302 stores software revision deployment application 350 that is configured to identify or generate the software revision/update 352 that is specific to the resource interaction event application requiring such and deploy the revision/update 354 to the applicable resource interaction event application. In specific embodiments of the invention, in which the resource interaction event application is a payment application, software revision deployment application 350 is configured to identify or generate the software revision/update required for the payment application and deploy the revision/update to the applicable payment application of the corresponding POS device.

In further response to the monitoring, the monitoring application 310 is configured to determine the need to deploy one or more service applications 330 to the resource interaction device 200. The service applications are configured to integrate with the preexisting resource interaction event application. In specific embodiments of the invention, the service applications may include, but are not limited to, an inventory control and management application that integrates with the resource interaction event application. In specific embodiments of the invention, in which the resource interaction event application is a payment application, the service applications may be any application that uses the data provided by the payment application, such as, but not limited to, an inventory control and management application or the like. In response to determining the need to deploy the one or more service applications 330, the one or more service applications may be automatically deployed to the resource interaction devices 200 or the resource interaction entity may be notified/alerted of the need to deploy the service applications.

In further response to the monitoring, the monitoring application 310 is configured to determine the need for different types 340 of resource interaction devices 200. For example, in those embodiments in which the resource interaction devices 200 are POS devices, the different types of POS devices may include, but are not limited to, chip card readers, magnetic strip card readers, mobile tablet-like POS devices and the like. In such embodiments of the invention, determination of the need for different types of resource interaction devices 200 may result in the automatic deployment of such devices or the resource interaction entity may be notified/alerted of the need for different types of resource interaction devices 200.

Figure 3:
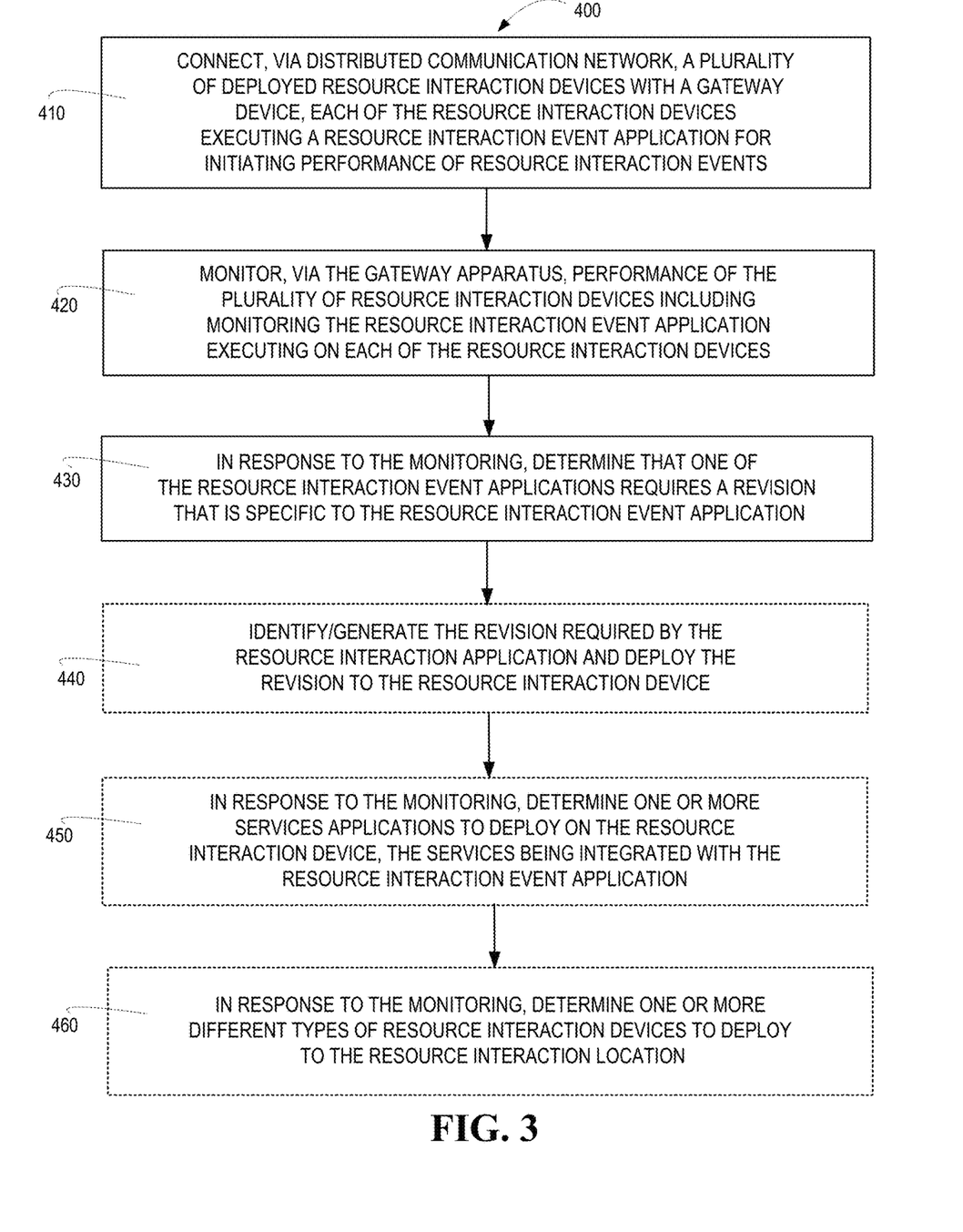
FIG. 3 is a flow diagram of a method for managing deployed resource interaction devices, in accordance with embodiments of the present invention.

Referring to FIG. 3, a flow diagram is presented of a method 400 for managing deployed resource interaction devices, in accordance with embodiments of the present invention. At Event 410, a plurality of deployed resource interaction devices are connected, via distributed communication network to a gateway apparatus. Each of the resource interaction devices execute a resource interaction event application configured to initiate performance of resource interaction events. In specific embodiments of the method, the resource interaction devices are POS devices that execute customized payment applications for initiating payment transactions.

At Event 420, the gateway apparatus monitors the performance of the plurality of resource interaction devices, specifically, the performance of the resource interaction event application executing on the resource interaction device. In specific embodiments of the invention, in which the resource interaction device is a POS device, the gateway apparatus monitors the performance of the payment application executing of the POS device.

At Event 430, in response to the monitoring, a determination is made that at least one of the plurality of resource interaction event applications requires an update/revision that is specific (i.e., customized) to the resource interaction event application. In specific embodiments of the method 400, at Event 440, the revision/update required by the resource interaction event application is identified or generated and deployed to the applicable resource interaction device. In specific embodiments of the invention, in which the resource interaction event application is a payment application, a determination is made that the payment application requires an update/revision and the revision/update is subsequently identified or generated and deployed to the applicable POS device.

At optional Event 450, in response to monitoring, a determination is made that the resource interaction device requires or otherwise needs deployment or one or more service applications that is integrated with the resource interaction event application, such as an inventory control and management application integrated with a payment application or the like. The service applications may be automatically deployed to the applicable resource interaction devices or the end user may be notified of the need to deploy the service applications.

At optional Event 460, in response to monitoring, a determination is made that one or more different types of resource interaction devices are required to be or otherwise need to be deployed at the resource interaction entity location. The different types of resource interaction devices may be automatically deployed to the resource interaction entity/ location or the end user/resource interaction entity may be notified of the need to deploy the different types of resource interaction devices.

Figure 4:
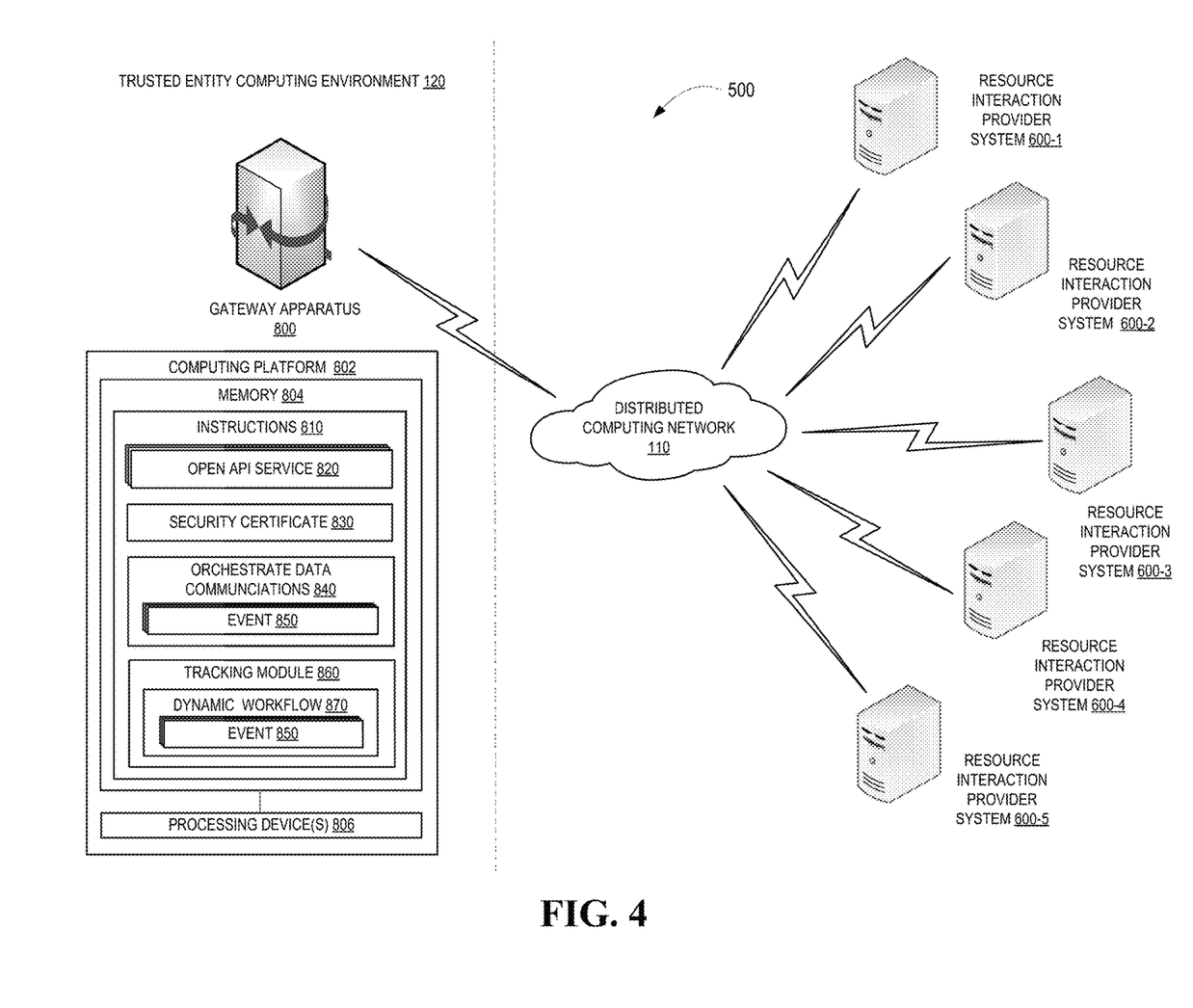
FIG. 4 is a schematic diagram of a system for managing fulfillment of resource interaction device, in accordance with some embodiments of the present disclosure.

Referring to FIG. 4, a system 500 is illustrated for managing fulfillment of resource interaction device, in accordance with embodiments of the present invention. The system 500 is implemented in a distributed computing network 110, which may include the Internet, and/or one or more intranets or the like. The system 500 additionally includes a plurality of resource interaction device provider systems 600-1-600-5. In specific embodiments of the invention in which the resource interaction device is a payment device, such as a point-of-sale (POS) device or the like, the resource interaction device providers are any entity that contributes hardware and software components to the device, installs hardware/software components in the device, assembles/manufacturers the device, stores the device, delivers/ships the device or the like. The systems 600-1-600-5 may be order systems, workflow systems, inventory systems, manufacturing system, customer relationship management (CRM) systems or any other system that tracks events related to the component or service that the provider/entity provides for the resource interaction device. Thus, for any one resource interaction device provider multiple systems 600 may be included in the plurality of systems. While FIG. 4 depicts five exemplary resource interaction device provider systems, those of ordinary skill in the art will appreciate that a conventional resource interaction fulfillment will involve additional resource interaction device provider systems.

The system additionally includes a gateway apparatus 800 that located in or otherwise accessible via a trusted entity computing environment 120. In specific embodiments of the invention the trusted entity is the entity that procures the resource interaction device for the end user (e.g., a financial institution procuring POS devices (with financial institution-specific a payment platform) for a merchant or the like). The gateway device includes a computing platform 802 having a memory 804 and one or more processing devices 806 in communication with the memory. The memory stores instructions 810 that are executable by the processing device(s) 806 and configured to connect and integrate one or more open Application programming Interface (API) services 820 with the plurality of resource interaction device provider systems 600-1-600-5. Integration of the API services 820 with the resource interaction device provider systems 600-1-600-5 includes deploying and implementing a trusted entity security certificate 830 for securing data communications between the gateway apparatus 800 and the resource interaction device provider systems 600-1-600-5. As such, the present invention leverages the security features provided for by the trusted entity's security certificate.

In addition, integration of the API services 820 with the resource interaction device provider systems 600-1-600-5 includes orchestration 840 of data communications between the gateway device 800 and the resource interaction device provider systems 600-1-600-5 to track the status and occurrence of events 850 in a resource interaction device fulfillment process. Such orchestration may include, but is not limited to, communicating requests to the resource interaction device provider systems 600-1-600-5 requesting an action 850 and receiving status updates on the event and/or confirmation that event has occurred. Since the gateway apparatus 800 is in direct communication with each of the resource interaction device provider, the orchestration of the data communications further includes informing upstream resource interaction device provider as to progress/completion of downstream events that may affect the upstream resource interaction device provider or allowing resource interaction device provider to connect to the gateway to receive such information. Moreover, the information that is accessible to the resource interaction device providers is provider-specific, such that information is available to the providers on a need-to-know basis. As a result, the resource interaction providers are not required to be direct communication with upstream and/or downstream resource interaction device providers and, instead, can obtain information related to applicable upstream and/or downstream resource providers from the gateway apparatus.

Moreover, the instructions 810 include a tracking module 860 that is configured to generate a dynamic workflow 870 that tracks the progress of the resource interaction device fulfilment process based on the event 850 data received from the resource interaction provider systems 600-1-600-5. As such that gateway device 800 is able to provide an overall picture of the current state of the fulfillment process and assess how delays in completion of events may affect upstream providers and the overall completion of the fulfillment process.

Figure 5:
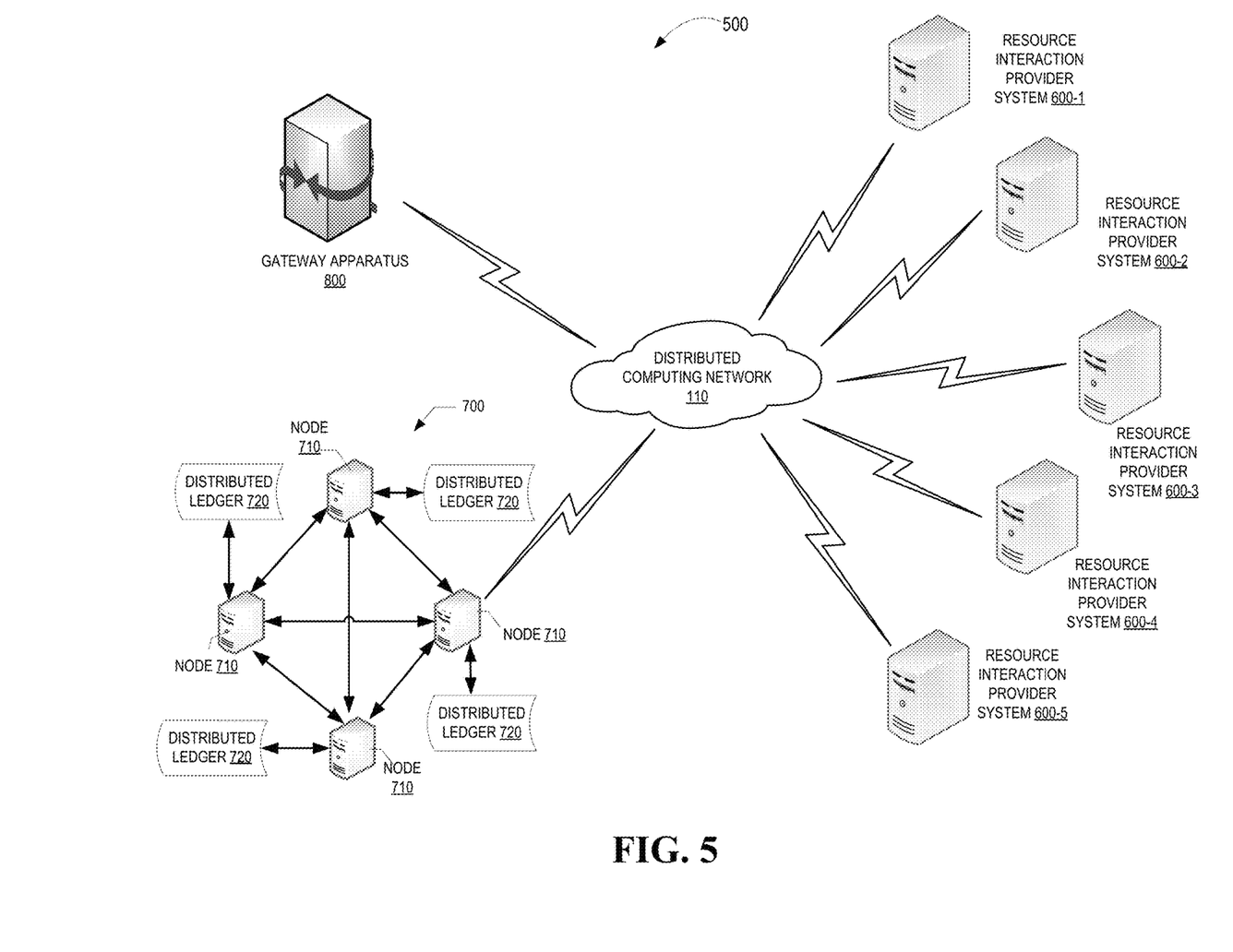
FIG. 5 is a schematic diagram of an alternate system for managing fulfillment of resource interaction device in accordance with some embodiments of the present disclosure.

Referring to FIG. 5 a schematic diagram of a system 500 for managing fulfilment of resource interaction device, in accordance with alternative embodiments of the invention. The system 500 includes a distributed trust network 700, otherwise referred to as a blockchain network that includes a plurality of decentralized nodes 710. Each decentralized node 710 has a memory (not shown in FIG. 5) and one or more processing devices (not shown in FIG. 5) in communication with the memory. The memory stores at least one distributed ledger 720 comprising a plurality of "chained" data blocks 730 (shown in FIG. 6). Each data block 730 stores event data 740 (shown in FIG. 6), received from the gateway apparatus 800, related to at least one event 850 in the resource interaction device fulfillment process.

In a distributed trust computing network the security of the data maintained within the trust network is enhanced by the distributed nature of the network/block chain. The distributed trust computing network 700 typically includes several decentralized nodes 710, which may be one or more systems, machines, computers, databases, data stores or the like operably connected with one another. In some instances, each of the decentralized nodes 710 or multiple nodes 710 are maintained by different entities. A distributed trust computing network 700 typically works without a central repository or single administrator. One well-known application of a distributed trust computing network/block chain is the public ledger of transactions for cryptocurrencies such as used in bitcoin. The data records recorded in the distributed trust computing network/block chain are enforced cryptographically and stored on the nodes of the block chain.

A distributed trust computing network 700 provides numerous advantages over traditional storage networks/databases. A large number of nodes 710 of a trust network may reach a consensus, otherwise referred to as converging, regarding the validity of resources maintained with a block of the blockchain. In the present invention, two or more of the nodes 710 converge on each data block 730 stored on the distributed ledger 720 to verify the validity of the event data 740 (e.g., verify that the event has occurred or the like).

Additionally, when multiple versions of a record exist on the ledger 720 (e.g., multiple data blocks including the event data associated with the same event), multiple nodes 710 can converge on the most up-to-date version of the record, such that the most-up-to-date version of the record is the only one of the versions that is validated. For example, any node 710 within the distributed trust computing network 700 that stores a record can determine within a level of certainty whether the record can be authenticated/authorized to take place and become final by confirming that no conflicting records are confirmed by the distributed trust computing network/block chain elsewhere.

The distributed trust computing network 700 typically has two primary types of records. The first type is the record type, which consists of the actual data stored in a block 730 within a distributed ledger 720. The second type is the block type, which are records that confirm when and in what sequence certain events became recorded as part of the blockchain. Records and the events associated therewith are created by participants using the blockchain in its normal course of business, for example, when record is received, a block(s) 730 is created by users known as "miners" who use specialized software/equipment to create blocks 730. Holders (also, referred to as users) of a block 730 of the blockchain agree to store a record within the distributed trust computing network 700 and the related records are passed around to various nodes 710 of the distributed trust computing network 700. A "valid" record or related event is one that can be validated based on a set of rules that are defined by the particular system implementing the distributed trust computing network/block chain.

Figure 6:
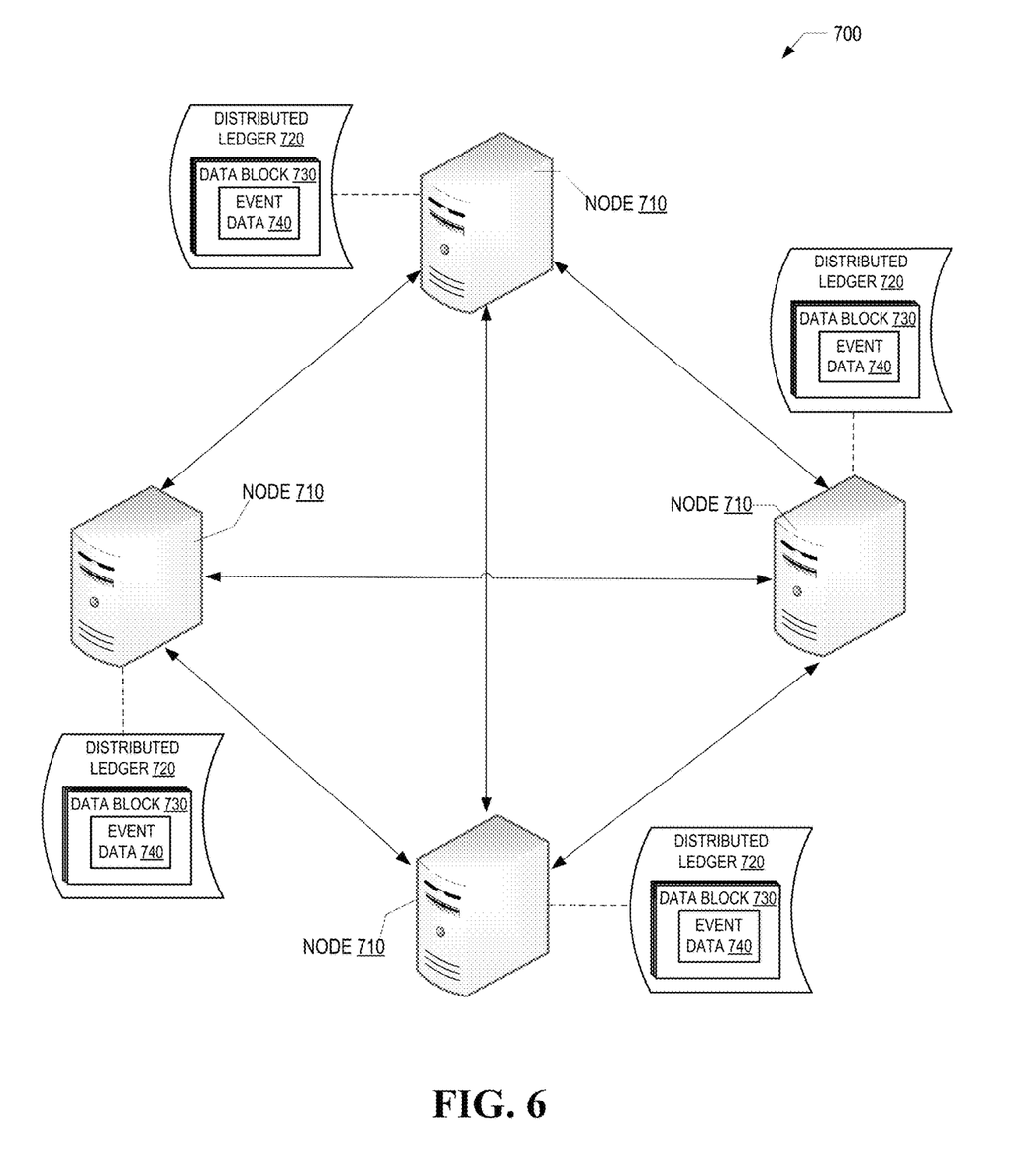
FIG. 6 is a schematic diagram of a trusted distributed computing network, in accordance with embodiment of the present invention.

In accordance with embodiments of the present invention, each distributed node 710 is associated with/in control of one of the plurality of resource interaction device providers. As such, data blocks 730 may be configurable to be accessed in a node-specific manner (i.e., only specified resource interaction device providers may access specified data blocks). In this regard, the event data 740 stored in the data blocks 730 is disseminated to the providers on a need-to-know basis.

A distributed trust computing network/block chain 700 is typically decentralized—meaning that a distributed ledger 720 (i.e., a decentralized ledger) is maintained on multiple nodes 710 of the trust network/block chain 700. One node 710 in the distributed trust computing network 700/block chain may have a complete or partial copy of the entire distributed ledger 720 or set of records and/or data blocks 730 on the distributed trust computing network 700/block chain. Events (e.g., addition of a new data block) are initiated at a node 710 of a distributed trust computing network 700/block chain and communicated to the various nodes 710 of the distributed trust computing network 700/blockchain. Any of the nodes 710 can validate a record or an associated event, add the record or the details of the storage event to its copy of the distributed ledger &20, and/or broadcast the record or details of the storage event, its associated validation (in the form of a block 430) and/or other data to other nodes 710. The distributed trust computing network 700 shown in FIGS. 5 and 6 is configured to perform one or more of the steps or functions performed by the system shown in FIGS. 4 and 5, the gateway apparatus shown in FIG. 7 and the methods described by FIG. 8.

Figure 7:
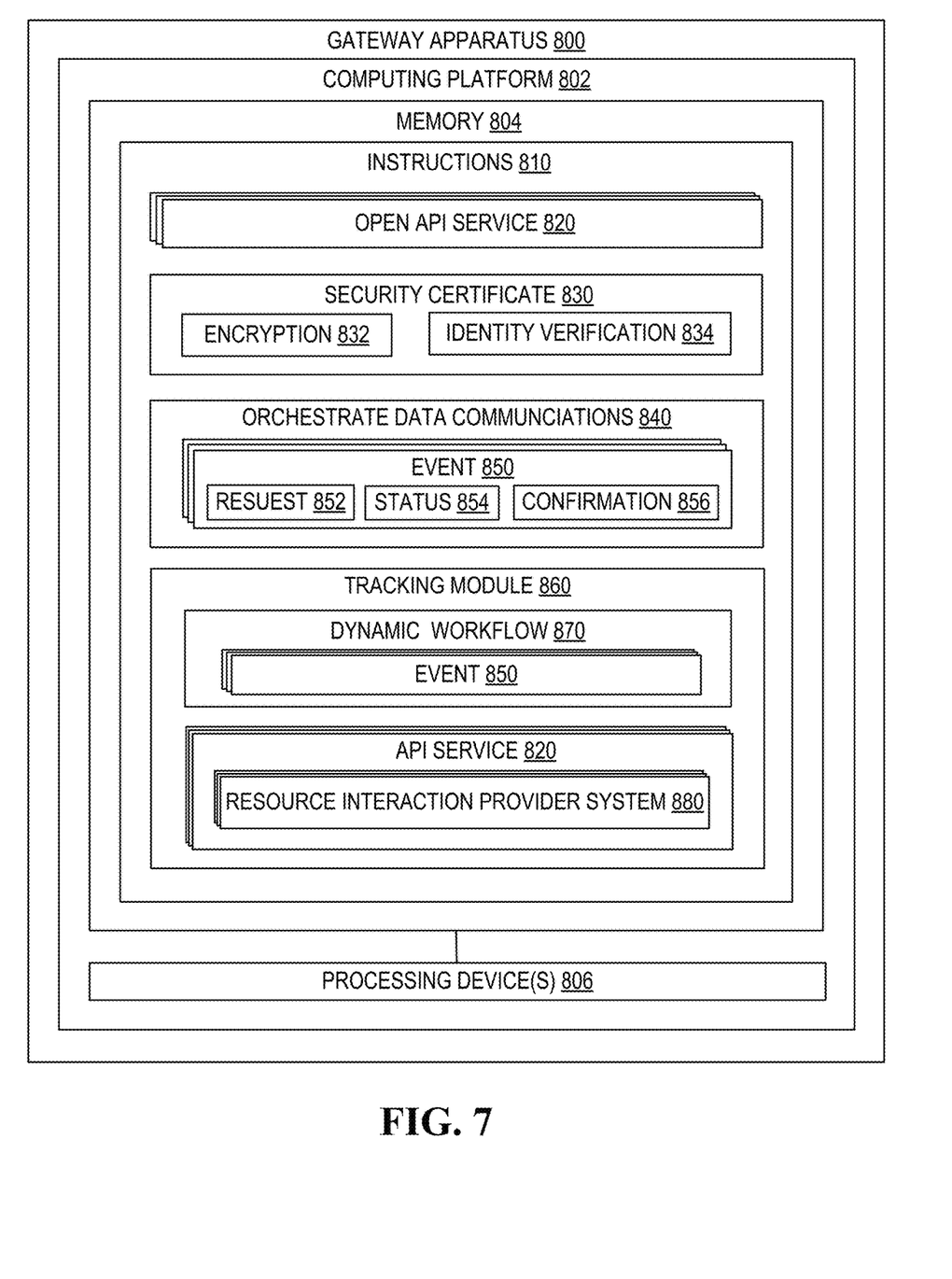
FIG. 7 is a block diagram of a gateway device used to orchestrate data communications with resource interaction device provider systems, in accordance with embodiments of the present invention.

Referring to FIG. 7 a block diagram is depicted of a gateway apparatus 800 configured for managing fulfillment of resource interaction device, in accordance with embodiments of the present invention. The gateway apparatus includes a computing platform 802, which may comprise one or more computing devices (e.g., servers, computing devices, or the like), is configured to execute instructions 810, such as algorithms, modules, routines, applications and the like. Computing platform 802 includes memory 804, which may comprise volatile and non-volatile memory, such as read-only and/or random-access memory (RAM and ROM), EPROM, EEPROM, flash cards, or any memory common to computing platforms). Moreover, memory 804 may comprise cloud storage, such as provided by a cloud storage service and/or a cloud connection service.

Further, computing platform 802 also includes at least one processing device 806, which may be an application-specific integrated circuit ("ASIC"), or other chipset, logic circuit, or other data processing device. Processing device(s) 806 may execute one or more application programming interface (APIs) 820 that interface with any resident programs, such as instructions 810 or the like, stored in the memory 804 of the computing platform 802 and any external programs. Processing devices(s) 806 may include various processing subsystems (not shown in FIG. 7) embodied in hardware, firmware, software, and combinations thereof, that enable the functionality of the computing platform 802 and the operability of the computing platform 802 on the distributed computing network 110 (shown in FIG. 4). For example, processing subsystems allow for initiating and maintaining communications and exchanging data with other networked devices. For the disclosed aspects, processing subsystems of processing device 806 may include any subsystem used in conjunction with instructions 810 and related tools, routines, sub-routines, algorithms, sub-algorithms, sub-modules thereof.

Computing platform 802 may additionally include a communications module (not shown in FIG. 7) embodied in hardware, firmware, software, and combinations thereof, that enables electronic communications between the computing platform 802 and other network devices, such as resource interaction device provider systems 600 and distributed trust computing network 700 (shown in FIG. 5). Thus, communication module may include the requisite hardware, firmware, software and/or combinations thereof for establishing and maintaining a network communication connection with one or more network devices.

Memory 802 of computing platform 800 stores instructions 810 that are configured to be executable by the processing device(s) 806 and configured to connect and integrate one or more open Application programming Interface (API) services 820 with the plurality of resource interaction device provider systems 600-1-600-5 (shown in FIGS. 4 and 5). Integration of the API services 820 with the resource interaction device provider systems includes deploying and implementing a trusted entity security certificate 830 for securing data communications between the gateway apparatus 800 and the resource interaction device provider systems 600-1-600-5. As such, the present invention leverages the security features provided for by the trusted entity's security certificate. The security features may include, but are not limited to encryption 832 of data communication and identity verification 834.

In addition, integration of the API services 820 with the resource interaction device provider systems includes orchestration 840 of data communications between the gateway device 800 and the resource interaction device provider systems to track the status and occurrence of events 850 in a resource interaction device fulfillment process. Such orchestration may include, but is not limited to, communicating requests 852 to the resource interaction device provider systems requesting an action 850 and receiving status 854 updates on the event and/or confirmation 856 that event has occurred. Since the gateway apparatus 800 is in direct communication with each of the resource interaction device providers, the orchestration of the data communications further includes informing upstream resource interaction device provider as to progress/completion of downstream events that may affect the upstream resource interaction device provider or allowing resource interaction device provider to connect to the gateway to receive such information. Moreover, the information that is accessible to the resource interaction device providers is provider-specific, such that information is available to the providers on a need-to-know basis. As a result, the resource interaction providers are not required to be direct communication with upstream and/or downstream resource interaction device providers and, instead, can obtain information related to applicable upstream and/or downstream resource providers from the gateway apparatus.

Moreover, the instructions 810 include a tracking module 860 that is configured to generate a dynamic workflow 870 that tracks the progress of the resource interaction device fulfilment process based on the event 850 data received from the resource interaction provider systems 600-1-600-5. As such that gateway device 800 is able to provide an overall picture of the current state of the fulfillment process and assess how delays in completion of events may affect upstream providers and the overall completion of the fulfillment process. In addition, tracking module 860 tracks the specific API services 820 that are deployed to specific resource interaction provider systems 880.

Figure 8:
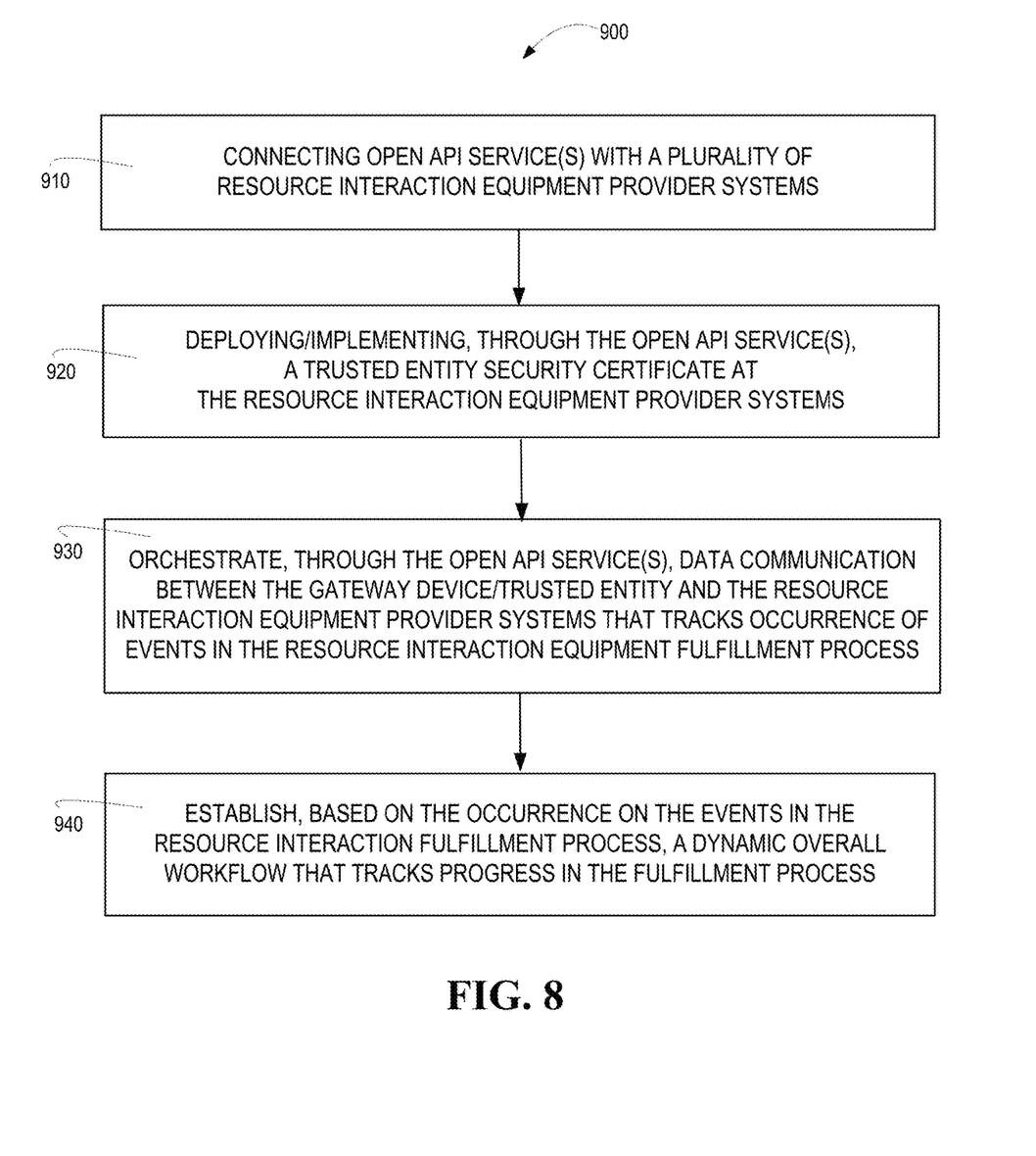
FIG. 8 is flow diagram of a method for managing fulfillment of resource interaction device, in accordance with embodiments of the present invention.

Referring to FIG. 8 a flow diagram of a method 900 for managing fulfillment of resource interaction device, in accordance with embodiments of the present invention. At Event 910, open Application Programming Interface (API) services are connected to a plurality of resource interaction device provider systems. In specific embodiments of the invention in which the resource interaction device is a payment device, such as a point-of-sale (POS) device or the like, the resource interaction device providers are any entity that contributes hardware and software components to the device, installs hardware/software components in the device, assembles/manufacturers the device, stores the device, delivers/ships the device or the like. In such embodiments of the invention, the systems may be order systems, workflow systems, inventory systems, manufacturing system, customer relationship management (CRM) systems or any other system that tracks events related to the component or service that the provider/entity provides for the resource interaction device.

At Event 920, a trusted entity security certificate is deployed and implemented at the resource interaction device providers for securing data communications between a gateway apparatus and the resource interaction device provider systems. As such, the present invention leverages the security features, such as encryption and identity verification, provided for by the trusted entity's security certificate At Event 930, data communications between the gateway device and the resource interaction device provider systems are orchestrated to track the status and occurrence of events in a resource interaction device fulfillment process. Such orchestration may include, but is not limited to, communicating requests to the resource interaction device provider systems requesting an action and receiving status updates on the event and/or confirmation that event has occurred. Since the gateway apparatus is in direct communication with each of the resource interaction device provider, the orchestration of the data communications further includes informing upstream resource interaction device provider as to progress/completion of downstream events that may affect the upstream resource interaction device provider or allowing resource interaction device provider to connect to the gateway to receive such information. Moreover, the information that is accessible to the resource interaction device providers is provider-specific, such that information is available to the providers on a need-to-know basis. As a result, the resource interaction providers are not required to be direct communication with upstream and/or downstream resource interaction device providers and, instead, can obtain information related to applicable upstream and/or downstream resource providers from the gateway apparatus.

At Event 940, a dynamic overall workflow status is established/generated that tracks the progress of the resource interaction device fulfilment process based on the event data received from the resource interaction provider systems. As such that gateway device is able to provide an overall picture of the current state of the fulfillment process and assess how delays in completion of events may affect upstream providers and the overall completion of the fulfillment process. In addition, the information that is obtained by the gateway device from the various third-party provides forms a historical equipment data book for the equipment (e.g., serial numbers of components, which component and software are installed and the like).

Thus, present embodiments of the invention provides A system that provides for managing deployed resource interaction devices/equipment through a gateway device that is capable of monitoring the performance of the resource interaction devices/equipment to determine a need for revisions/updates to the resource interaction event application, additional services and/or different resource interaction devices types. Additionally. Other present embodiments of the invention provide for management of resource interaction device fulfillment via a gateway apparatus that uses Application Programming Interface (API) services to connect and integrate with the various systems deployed by the equipment providers, such that, all data communication between the managing entity and the equipment providers is orchestrated through the gateway apparatus to track the occurrence of events associated with resource interaction device fulfillment. Additionally, a distributed trust computing network is implemented in which each of the equipment providers serve as a decentralized node in the distributed trust computing network capable of converging on a data block to verify the validity of the equipment fulfillment process event stored in the block.

The features, functions, and advantages that have been discussed may be achieved independently in various embodiments of the present invention or may be combined with yet other embodiments, further details of which can be seen with reference to the following description and drawings.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for managing deployed resource interaction device, the system comprising:
   a plurality of resource interaction devices, each device deployed at one of a plurality of resource interaction locations, wherein each resource interaction device includes a computing platform having a first memory, one or more first processing devices in communication with the first memory and a resource interaction event application stored in the first memory, executable by the at least one of the first processing devices and configured to initiate performance of resource interaction events, wherein the resource interaction devices are Point-of-Sale (POS) devices, the resource interaction event application is a merchant-specific payment application and the resource interaction events are purchase transactions; and
   a gateway apparatus including a second computing platform having a second memory, one or more second processing devices in communication with the second memory, and in distributed communication network communication with the plurality of interaction devices, wherein the gateway apparatus further includes a monitoring application stored in the second memory, executable by at least one of the second processing devices and configured to:
      monitor the plurality of resource interaction devices including monitoring the resource interaction event application executing on each of the plurality of resource interaction devices for (i) average time for performing a purchase transaction at the POS device, (ii) average time between purchase transaction events, and (iii) average volume of purchase transactions occurring over predetermined time periods,
      in response to the monitoring, determine that one of the resource interaction event applications executing on one of the resource interaction devices requires a revision that is specific to the one of the resource interaction event applications, and
      in response to determining that one of the resource interaction event applications requires the revision, generating the revision required by the one of the resource interaction event applications and deploying the revision to the one of the resource interaction event applications.

2. The system of claim 1, wherein the gateway apparatus is configured to monitor the resource interaction event application, wherein monitoring includes monitoring for errors occurring in the performance of resource interaction events.

3. The system of claim 1, wherein the gateway apparatus is configured to monitor the resource interaction event application, wherein monitoring includes monitoring at least one of (i) specific objects or types of objects included in resource interaction events, (ii) volume of resources associated with resource interaction events, and (iii) types of resource event vehicles used to perform the resource interaction events.

4. The system of claim 1, wherein the monitoring application is further configured to:
   in response to the monitoring, determine one or more service applications to deploy on the resource interaction device, wherein the one or more services applications are integrated with the resource interaction event application.

5. The system of claim 4, wherein the one or more service applications include an inventory management and control application.

6. The system of claim 1, wherein the monitoring application is further configured to:
   in response to monitoring, determine one or more different types of resource interaction devices to deploy to a corresponding one of the resource interaction locations.

7. A computer-implemented method for managing deployed resource interaction devices, the method is executed by one or more computing processor devices and comprises:
   connecting, via a distributed communication network, a plurality of resource interaction devices with a gateway apparatus, wherein each of the resource interaction devices execute a resource interaction event application for initiating performance of resource interaction events, wherein the resource interaction devices are Point-of-Sale (POS) devices, the resource interaction event application is a merchant-specific payment application and the resource interaction event is a purchase transaction;
   monitoring, via the gateway apparatus, the plurality of resource interaction devices including monitoring the resource interaction event application executing on each of the plurality of resource interaction devices for (i) average time for performing a purchase transaction at the POS device, (ii) average time between purchase transaction events, and (iii) average volume of purchase transactions occurring over predetermined time periods;

in response to the monitoring, determining that one of the resource interaction event applications executing on one of the resource interaction devices requires a revision that is specific to the one of the resource interaction event applications; and in response to determining that one of the resource interaction event applications requires the revision, (i) generating the revision required by the one of the resource interaction event applications, and (ii) deploying the revision to the one of the resource interaction event applications.

8. The computer-implemented method of claim 7, wherein monitoring, via the gateway apparatus, the plurality of resource interaction devices includes monitoring the resource interaction event application for errors occurring in the performance of resource interaction events.

9. The computer-implemented method of claim 7, wherein monitoring, via the gateway apparatus, the plurality of resource interaction devices includes monitoring includes monitoring at least one of (i) specific objects or types of objects included in resource interaction events, (ii) volume of resources associated with resource interaction events, and (iii) types of resource event vehicles used to perform the resource interaction events.

10. The computer-implemented method of claim 7, wherein the method further comprises:

in response to the monitoring, determining one or more service applications to deploy on the resource interaction device, wherein the one or more services applications are integrated with the resource interaction event application.

11. The computer-implemented method of claim 7, wherein the method further comprises:

in response to monitoring, determining one or more different types of resource interaction devices to deploy to a location of the resource interaction device.

12. A computer program product comprising:

a non-transitory computer-readable medium comprising:

a first set of codes for causing a computer to connect, via a distributed communication network, a plurality of resource interaction devices with a gateway apparatus, wherein each of the resource interaction devices execute a resource interaction event application for initiating performance of resource interaction events, wherein the resource interaction devices are Point-of-Sale (POS) devices, the resource interaction event application is a merchant-specific payment application and the resource interaction event is a purchase transaction;

a second set of codes for causing a computer to monitor, via the gateway apparatus, the plurality of resource interaction devices including monitoring the resource interaction event application executing on each of the plurality of resource interaction devices for (i) average time for performing a purchase transaction at the POS device, (ii) average time between purchase transaction events, and (iii) average volume of purchase transactions occurring over predetermined time periods;

a third set of codes for causing a computer to, in response to the monitoring, determine that one of the resource interaction event applications executing on one of the resource interaction devices requires a revision that is specific to the one of the resource interaction event applications; and a fourth set of codes for causing a computer to, in response to determining that one of the resource interaction event applications requires the revision, (i) generate the revision required by the one of the resource interaction event applications, and (ii) deploy the revision to the one of the resource interaction event applications.

13. The computer program product of claim 12, further comprising:

a fourth set of codes for causing a computer to, in response to the monitoring, determine one or more service applications to deploy on the resource interaction device, wherein the one or more services applications are integrated with the resource interaction event application.

14. The computer program product of claim 12, further comprising:

a fourth set of codes for causing a computer to, in response to monitoring, determine one or more different types of resource interaction devices to deploy to a location of the resource interaction device.

* * * * *